(12) United States Patent
Calabro et al.

(10) Patent No.: US 10,038,516 B2
(45) Date of Patent: Jul. 31, 2018

(54) SPECTRAL INVERSION DETECTION FOR POLARIZATION-DIVISION MULTIPLEXED OPTICAL TRANSMISSION

(71) Applicant: Xieon Networks S.à.r.l., Senningerberg (LU)

(72) Inventors: Stefano Calabro, Munich (DE); Bernhard Spinnler, Oberhaching (DE)

(73) Assignee: Xieon Networks S.a.r.l., Senningerberg (LU)

( * ) Notice: Subject to any disclaimer, the term of this patent is extended or adjusted under 35 U.S.C. 154(b) by 0 days.

(21) Appl. No.: 15/529,027

(22) PCT Filed: Dec. 2, 2015

(86) PCT No.: PCT/EP2015/078397
§ 371 (c)(1),
(2) Date: May 23, 2017

(87) PCT Pub. No.: WO2016/087538
PCT Pub. Date: Jun. 9, 2016

(65) Prior Publication Data
US 2017/0264389 A1    Sep. 14, 2017

(30) Foreign Application Priority Data
Dec. 2, 2014    (EP) ..................... 14195812

(51) Int. Cl.
*H04B 10/00*    (2013.01)
*H04J 14/06*    (2006.01)
(Continued)

(52) U.S. Cl.
CPC ............ *H04J 14/06* (2013.01); *G02F 1/2255* (2013.01); *H04B 10/5053* (2013.01);
(Continued)

(58) Field of Classification Search
USPC .................................................. 398/182–191
See application file for complete search history.

(56) References Cited

U.S. PATENT DOCUMENTS 6,046,838 A * 4/2000 Kou ...................... G02F 1/0516
359/239
6,163,395 A * 12/2000 Nemecek ........... H04B 10/5053
348/E7.094
(Continued)

FOREIGN PATENT DOCUMENTS

| EP | 2 164 199 A2 | 3/2010 |
| EP | 2660648 A1 | 11/2013 |
| WO | 2014/034047 A1 | 3/2014 |

OTHER PUBLICATIONS

International Search Report and Written Opinion, PCT/EP2015/078397, dated Feb. 10, 2016, 15 pages.
(Continued)

*Primary Examiner* — Agustin Bello
(74) *Attorney, Agent, or Firm* — Nelson Mullins Riley & Scarborough LLP (57) ABSTRACT

Disclosed herein is a modulator (50) for polarization-division multiplexing (PDM) transmission. The modulator (50) comprises first and second DP-MZMs (12, 28) associated with first and second polarizations, each DP-MZM (12, 28) having an input for an in-phase and a quadrature driving signal for modulating the in-phase and quadrature components of an optical signal according to respective transfer functions, and a detector (58) suitable for detecting light comprising at least a portion of the light outputted by the first DP-MZM (12) and a portion of the light outputted by the second DP-MZM (28). The modulator (50) is adapted to superimpose a first pilot signal on one of the in-phase and quadrature driving signals of the first DP-MZM (12) and on one of the in-phase and quadrature driving signals of the
(Continued)

second DP-MZM (28), and a second pilot signal on the respective other of the in-phase and quadrature driving signals of the first and second DP-MZMs (12, 28). Further, the first and second pilot signals are chosen such that the signal detected by said detector (58) is indicative as to whether the slopes of the transfer functions are different for the in-phase and quadrature components of one of the first and second DP-MZMs (12, 28) and identical for the other of the first and second DP-MZMs (12, 28).

26 Claims, 5 Drawing Sheets

(51) Int. Cl.
*G02F 1/225* (2006.01)
*H04B 10/50* (2013.01)
*G02F 1/21* (2006.01)

(52) U.S. Cl.
CPC .... *G02F 2001/212* (2013.01); *G02F 2201/58* (2013.01); *G02F 2203/07* (2013.01)

(56) References Cited

U.S. PATENT DOCUMENTS

| | | | | |
|---|---|---|---|---|
| 7,369,290 B1* | 5/2008 | Cox | ............... | G02F 1/0123 359/238 |
| 7,715,732 B2* | 5/2010 | Koh | ............... | G02F 1/0123 359/237 |
| 7,965,433 B2* | 6/2011 | Smith | ............... | G02F 1/0123 359/245 |
| 9,762,325 B2* | 9/2017 | Aitken | ............ | H04B 10/25752 |
| 2002/0131126 A1* | 9/2002 | Myers | ............. | H04B 10/07957 398/158 |
| 2010/0054757 A1* | 3/2010 | Smith | ............... | G02F 1/0123 398/198 |
| 2010/0119239 A1* | 5/2010 | Wang | ............. | H04B 10/50575 398/198 |
| 2010/0245968 A1* | 9/2010 | Smith | ............... | G02F 1/0123 359/239 |
| 2010/0271682 A1* | 10/2010 | Smith | ............... | G02F 1/0123 359/239 |
| 2014/0023368 A1* | 1/2014 | Bhandare | ............ | H04J 14/06 398/65 |
| 2015/0124309 A1* | 5/2015 | Smith | ............... | G02F 1/0123 359/276 |
| 2015/0244468 A1* | 8/2015 | Mak | ............... | H04B 10/5055 398/184 |
| 2015/0304043 A1* | 10/2015 | Aitken | ............... | G02B 6/3604 398/115 |
| 2017/0264389 A1* | 9/2017 | Calabro | ............... | H04J 14/06 |

OTHER PUBLICATIONS

Jacobsen, E. : "Handling Spectral Inversion in Baseband Processing," 8 pages, (2008) XP055193115, Retrieved from the Internet:URL:http://www.dsprelated.com/showarticle/51.php [retrieved on Jun. 2, 2015].

Sotoodeh, M. et al., "Modulator Bias and Optical Power Control of Optical Complex E-Field Modulators," Journal of Lightwave Technology, IEEE Service Center, New York, NY, US, vol. 29 (15):2235-2248 (2011) XP011336451, ISSN: 0733-8724, DOI:10.1109/JLT.2011.2158291.

* cited by examiner

SPECTRAL INVERSION DETECTION FOR POLARIZATION-DIVISION MULTIPLEXED OPTICAL TRANSMISSION

CROSS REFERENCE TO RELATED APPLICATIONS

This application is a 35 U.S.C. 371 national stage filing of International Application No. PCT/EP2015/078397, filed on Dec. 2, 2015, which claims priority to European Patent Application No. 14195812.4 filed on Dec. 2, 2014. The contents of the aforementioned applications are hereby incorporated by reference in their entireties.

FIELD OF THE INVENTION

The present invention is in the field of optical data transport technology. More particularly, the present invention relates to a modulator for polarization-division multiplexing (PDM) transmission, an optical transmitter comprising said modulator and a method for controlling an optical transmitter.

BACKGROUND OF THE INVENTION

Figure 1:
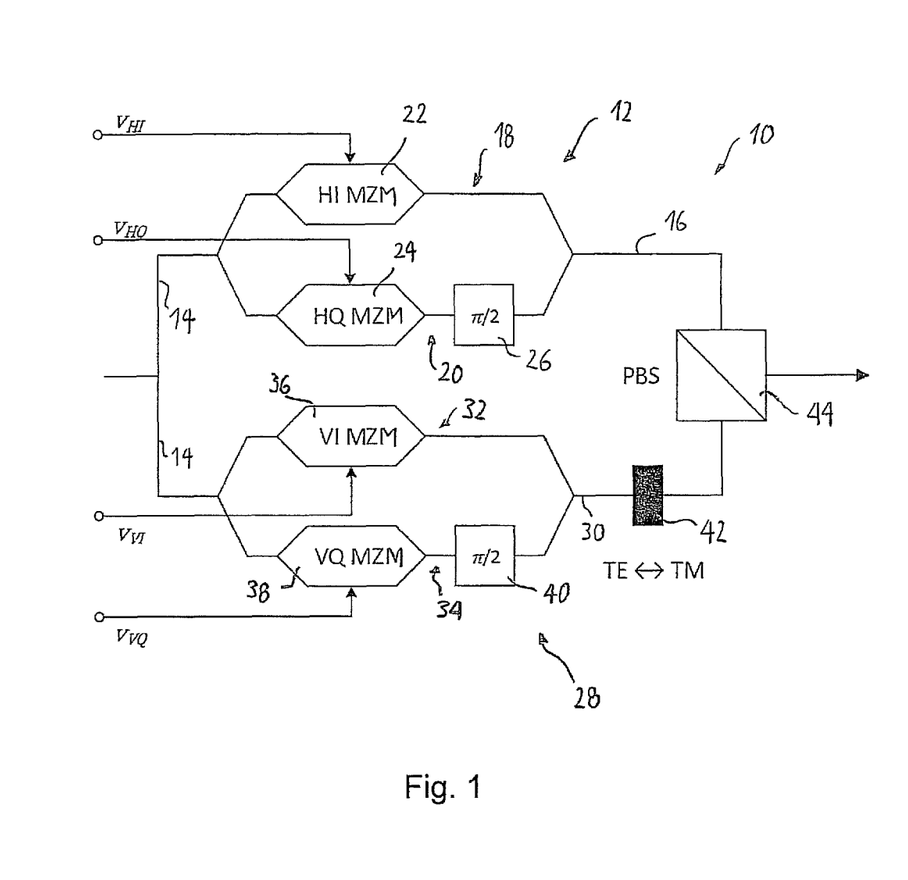
FIG. 1 shows a modulator for polarization-division multiplexed signals according to the prior art.

In FIG. 1, the structure of a conventional modulator 10 for polarization-division multiplexed (PDM) signals is shown. The modulator 10 of FIG. 1 is devised for PDM quadrature amplitude modulation (QAM). The modulator 10 comprises a first dual parallel Mach-Zehnder-modulator modulator (DP-MZM) 12, which comprises an input 14 for inputting an optical carrier, and an output 16 for outputting a QAM-modulated signal associated with a first polarization, which is referred to as "H-polarization" component in the following. Downstream of the optical input 14, the DP-MZM 12 branches into a first and a second arm 18, 20, respectively, that are rejoined at the optical output 16, thereby forming what is referred to as an "outer MZM" in the present disclosure.

Within each of the first and second arms 18, 20 of the outer MZM, respective first and second "inner" MZMs 22, 24 are provided. The first inner MZM 22 comprises electrodes (not shown) for applying a first driving voltage $V_{HI}$ for generating an in-phase component $s_{HI}$ of the H-polarization of the optical signal to be transmitted. In other words, the first driving voltage $V_{HI}$ is intended for modulating the part of the carrier signal propagating along the first arm 18 of the outer MZM according to the I-component of the base band signal. Likewise, electrodes (not shown) are associated with the second inner MZM 24, for applying a second driving voltage $V_{HQ}$ for generating a quadrature component $s_{HQ}$ of the H-polarization component of the optical signal. In the second arm 20, a first phase shifter 26 is provided in order to introduce the desired shift by 90° between the in-phase and quadrature components $s_{HI}$ and $s_{HQ}$ of the modulated signal before the I- and Q-modulated signals are combined at the optical output 16.

The modulator 10 further comprises a second DP-MZM 28 which is of similar structure as the first DP-MZM 12 and likewise comprises an optical input 14, which is identical to the optical input of the first DP-MZM 12, an optical output 30, and third and fourth arms 32, 34 including third and fourth inner MZMs 36 and 38, respectively. In the fourth arm 34, a further 90° phase shifter 40 is provided. Downstream of the optical output 30 of the second DP-MZM 28, a transverse-electric-/transverse-magnetic polarization mode converter 42 is provided, which polarizes the light outputted at the output 30 to a second polarization, referred to as the "V-polarization" hereinafter, wherein the H- and V-polarizations are orthogonal to each other. The third and fourth inner MZMs 36, 38 each have electrodes (not shown) for applying third and fourth driving voltages $V_{VI}$ and $V_{VQ}$, respectively, for generating in-phase and quadrature components $s_{VI}$ and $s_{VQ}$, respectively of the V-polarization component of the optical signal to be transmitted. The two orthogonally polarized optical signals are combined at a polarization beam splitter/combiner (PBS) 44 for outputting the combined signal. Since this combined signal comprises two mutually orthogonal polarization components H and V, the transmission method is referred to as a "polarization division multiplexing" (PDM).

Figure 2:
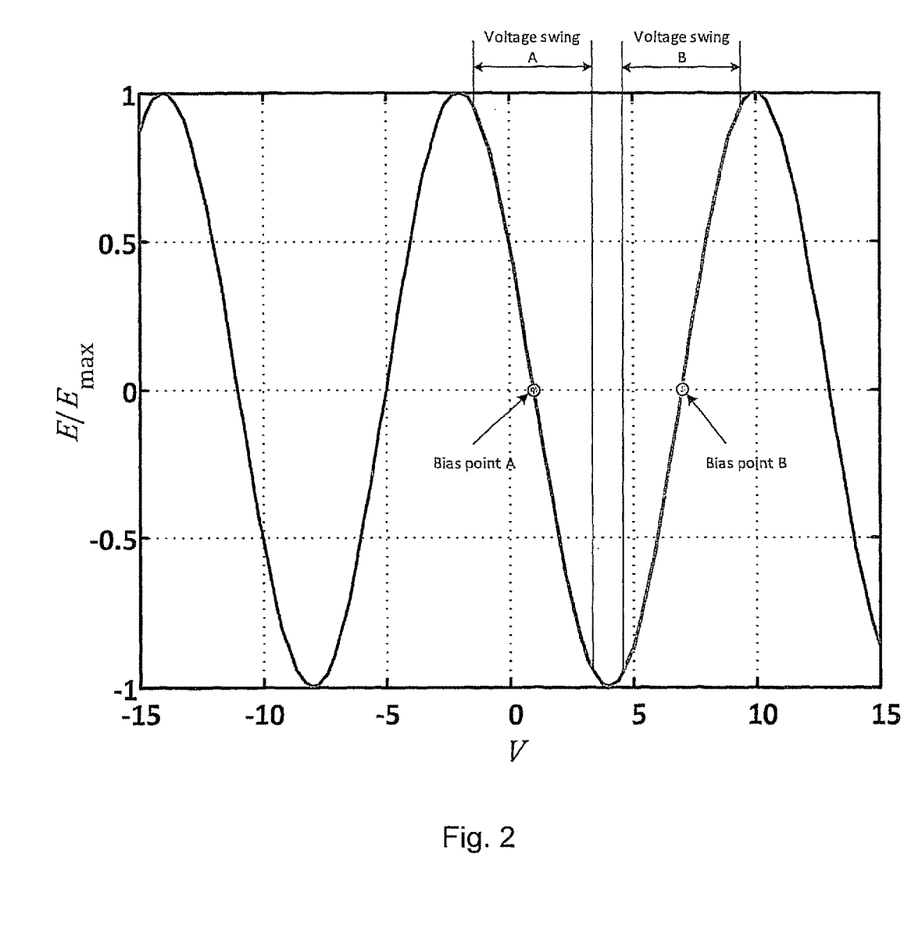
FIG. 2 shows the transfer function of a Mach-Zehnder modulator.

Each of the first through fourth inner MZMs 22, 24, 36, 38 exhibits a periodic, theoretically sinusoidal transfer function (see FIG. 2) between the respective driving voltage (i.e. $V_{HI}$, $V_{HQ}$, $V_{VI}$ or $V_{VQ}$) and the amplitude of the output electrical field component of the optical signal in the respective arm 18, 20, 32, 34 of the respective DP-MZM 12, 28. As shown in FIG. 2, to ensure a one-to-one correspondence between input and output, the inner MZMs 22, 24, 36, 38 are driven over a voltage swing region that does at least not exceed half a period of the transfer function. The swing of the driving voltage is typically centered on a biasing point, which for proper operation should lie at or at least near a zero-crossing of the transfer function. FIG. 2 shows two possible biasing points A and B with a respective swing of the driving voltage. Since the driving voltage aims at modulating an optical signal, it may also be referred to as "modulating voltage" herein.

In the art, several bias control algorithms are known to automatically adjust the bias voltage and to track the drift of the transfer function over temperature and time, such as the bias control algorithms disclosed in P. S. Cho, J. B. Khurgin, and I. Shpantzer, "Closed-loop bias control of optical quadrature modulator," IEEE Photonics Technology Letters, vol. 18, no. 21, pp. 2209-2211, November 2006 and M. Sotoodeh, Y. Beaulieu, J. Harley, and D. L. McGhan, "Modulator bias and optical power control of optical complex E-field modulators," IEEE Journal of Lightwave Technology, vol. 29, no. 15, pp. 2235-2248, August 2011. These prior art bias control algorithms monitor the optical output of each respective MZM via a photo diode. However, due to the quadratical characteristics of the employed photo-detectors, these algorithms cannot discern between bias points with negative transfer function slope, such as bias point A in FIG. 2, and bias points with positive transfer function slope, as is the case for bias point B in FIG. 2, thereby leading to an uncertainty in the sign of the actual transfer function.

For the sake of exemplification, let us first consider the H-polarization only, and assume that the equivalent complex base band representation of the intended QAM signal is $$s_H = s_{HI} + j \cdot s_{HQ}, \quad (1)$$

where j denotes the imaginary part of the complex number. It is further assumed that the biasing point of both inner MZMs 22, 24 has a positive slope, and that the optical fields $s_{HI}$ and $s_{HQ}$ are due to corresponding control voltages $V_{HI}$, $V_{HQ}$, respectively. If, however, the actual biasing points should both have a negative slope, for the same control voltages $V_{HI}$ and $V_{HQ}$, the H-polarization component of the optical signal S'$_H$, again in its complex base band representation would turn out to be $$s'_H = -s_{HI} - j \cdot s_{HQ}. \quad (2)$$

This signal $s'_H$ is congruent with $s_H$, except for a rotation by 180°. Accordingly, the uncertainty in the sign of the transfer function would combine with the uncertainty of the absolute channel phase over the entire optical channel, which can be seamlessly compensated during the demodulation process at the receiver side without impact on the data transmission.

However, if the slopes of the transfer functions for the HI and HQ components should have opposite signs, the resulting signal exhibits, along with a possible rotation, also a complex conjugation, which in the frequency domain corresponds to a so-called "spectral inversion" around the carrier frequency. For example, if the transfer function for the HI-component (i.e. of the first inner MZM 22) should have a positive slope at the bias point, while the transfer function of the HQ-component (i.e. of the second inner MZM 24) should have a negative slope, the actual transmit signal $s''_H$, i.e. the optical signal at the output 16 of the first DP-MZM 12 for the same driving voltages $V_{HI}$ and $V_{HQ}$ would turn out to be $$s''_H = -s_{HI} + j \cdot s_{HQ} = -s^*_H, \quad (3)$$

which is a rotated and complex conjugated version of the intended signal $s_H$.

The phenomenon of spectral inversion is for example described in E. Jacobsen, "Handling Spectral Inversion in Baseband Processing," http://www.dsprelated.com/showarticle/51.php Feb. 11, 2008. A compensation method for such spectral inversion for the case of radio systems is described in I. Horowitz, M. Ben-Ayun; E. Fogel, "A radio device with spectral inversion", GB2282286 (B)—Dec. 17, 1997.

In the case of so-called "blind" or "non-data aided" optical transmission, it is known to correct the spectral inversion at the receiver after complete demodulation. This is for example described in M. Kuschnerov, F. N. Hauske, K. Piyawanno, B. Spinnler, M. S. Alfiad, A. Napoli, and B. Lankl, "DSP for Coherent Single-Carrier Receivers," Journal of Lightwave Technology, Vol. 27, No. 16, Aug. 15, 2009, pp. 3614-3622. This is possible, because practical symbol constellations possess reflection symmetries through the origin of the IQ-plane and are therefore invariant under complex conjugation. Accordingly, a spectral inversion at the MZMs transforms the intended transmit signal into another valid transmit signal that is based upon the same symbol constellation and exhibits the same statistical properties. Accordingly, a blind demodulation process can be applied without any modification to the spectrally inverted signal. After demodulation, the recovered—and possibly complex conjugated—noisy symbols can then be de-mapped to hard-decided bits, or in the case of soft-decision forward error correction (EFC), to soft bits. At this stage the spectral inversion can then be detected and corrected. For this purpose, one can for example take advantage of the fact that, generally, the bit stream is organized in a frame structure with a unique word (UW) marking the beginning of each frame. The frame detector may continuously search for the periodic UW and raise a frame loss signal if it is unable to find it. This alarm can be used to trigger the correction of the spectral inversion, which can in this case be simply implemented via complex conjugation of the demodulated symbols before demapping.

The case of data-aided optical transmission, as for example described in M. Kuschnerov, M. Chouayakh, K. Piyawanno, B. Spinnler, E. de Man, P. Kainzmaier, M. S. Alfiad, A. Napoli, B. Lankl, "Data-Aided Versus Blind Single-Carrier Coherent Receivers," IEEE Photonics Journal, Vol. 2, No. 3, June 2010, pp. 386-403, poses more difficult challenges. In data-aided transmission, the modulator embeds training sequences and/or reference symbols into the transmit signal, and the demodulator exploits them to estimate the parameters necessary for proper demodulation, such as the channel response and the frequency and phase difference between transmit and receive lasers. Contrary to the symbol constellation, such training sequences and reference symbols are not invariant under complex conjugation. Therefore, in the case of data-aided transmission, spectral inversion would have to be corrected before data-aided demodulation. One possible solution for this could be similar to the solution described above for blind transmission: Spectral inversion could be detected at the receiver by searching for the training sequences or the reference symbols, and corrected via complex conjugation of the received samples before the demodulation process, for example in a way described in U.S. Pat. No. 7,697,636 B2. However, for reasons explained in the following, this approach cannot be easily applied in data-aided optical PDM transmission, i.e. if the signal includes two polarization components carrying independent data.

The additional difficulty in PDM applications is due to the fact that data-aided channel estimation for PDM systems is preferably performed by means of mutually orthogonal training sequences transmitted over the H- and V-polarizations. Although, in principle, orthogonality could be achieved by transmitting the training sequence on H while muting V and thereafter on V while muting H, this would not be bandwidth efficient and would also produce strong variations of the transmit power, which is detrimental in view of the nonlinearity of optical channels. For this reason, in M. Kuschnerov, M. Chouayakh, K. Piyawanno, B. Spinnler, E. de Man, P. Kainzmaier, M. S. Alfiad, A. Napoli, B. Lankl, "Data-Aided Versus Blind Single-Carrier Coherent Receivers," IEEE Photonics Journal, Vol. 2, No. 3, June 2010, pp. 386-403 it is recommended to transmit two orthogonal training sequences on H and V simultaneously. The two training sequences can for example be obtained via cyclic shift from a single repeated Constant-Amplitude Zero-Auto-Correlation (CAZAC) sequence.

If the H and V transmit signals are both generated with the correct polarity, or both spectrally inverted, the orthogonality of the training sequences is preserved, because if the two original sequences are orthogonal, the complex conjugated sequences are mutually orthogonal too. However, if one and only one polarization, i.e. H or V, is spectrally inverted, the orthogonality between the transmitted training sequences is lost. This situation is referred to as "inconsistent spectral polarity" in the following. Since in this case the H and V component of the signal are mixed, they cannot be individually complex conjugated before demodulation, but would rather have to be corrected at the transmitter. For PDM data-aided transmission, it would hence appear necessary to detect spectral inversion at the receiver by comparing the received signals with the expected training sequences, and to then correct the spectral inversion at the transmitter. This possible approach would hence require a backward channel from the receiver to the transmitter and suffers from a bootstrapping difficulty.

SUMMARY OF THE INVENTION

A problem underlying the invention is to provide an apparatus and a method for handling spectral inversion problems in PDM optical transmission in an efficient and reliable manner.

This problem is solved by a modulator according to claim 1, an optical transmitter employing such modulator as well as a method of controlling such an optical transmitter. Preferable embodiments are defined in the dependent claims.

The modulator of the invention comprises first and second Dual Parallel Mach-Zehnder-Modulators (DP-MZMs) associated with first and second polarizations, each DP-MZM having an input for an in-phase and a quadrature driving signal for modulating the in-phase and quadrature components of an optical signal according to respective transfer functions, and a detector suitable for detecting light comprising at least a portion of the light outputted by the first DP-MZM and a portion of the light outputted by the second DP-MZM. Further the optical modulator is adapted to superimpose a first pilot signal on one of the in-phase and quadrature driving signals of the first DP-MZM and on one of the in-phase and quadrature driving signals of the second -DP-MZM, and a second pilot signal on the respective other of the in-phase and quadrature driving signals of the first and second DP-MZMs.

Herein the first and second pilot signals are chosen such that the signal detectable by said detector is indicative as to whether the slopes of the transfer functions are different for the in-phase and quadrature components of one of the first and second DP-MZMs and identical for the other of the first and second DP-MZMs.

Contrary to the prior art discussed above, according to the present invention the "spectral inversion", more precisely the occurrence of "inconsistent spectral polarity", can be detected directly at the transmitter, rather than at the receiver. For this purpose, the modulator is adapted to superimpose a first pilot signal on one of the in-phase and quadrature driving signals of the first DP-MZM and on one of the in-phase and quadrature driving signals of the second DP-MZM, and a second pilot signal on the respective other of the in-phase and quadrature driving signals of the first and second DP-MZMs. Herein, the first and second pilot signals are chosen such that the signal detectable by the aforementioned detector is indicative as to whether the slopes of the transfer functions are different for the in-phase and quadrature components of one of the first and second DP-MZMs, and identical for the other of the first and second DP-MZMs. Accordingly, the first and second pilot signals are chosen such that the signal detectable by said detector is indicative as to whether exactly one of the polarization, i.e. H or V is spectrally inverted or, in other words, whether an "inconsistent spectral polarity" between the polarizations is present. If such inconsistent spectral polarity is detected, a complex conjugation of the output signal of one of the first or second DP-MZMs can be effected, which then always leads to a situation in which the H and V transmit signals are both correct, or both spectrally inverted. This final ambiguity can then be resolved at the receiver. For example, in the case of blind transmission, the spectral inversion can be detected by means of a unique word (UW) and corrected preferably after demodulation and before demapping. In the case of data-aided transmission, the detection of the spectral inversion relies upon the training sequences, and the correction consists in the conjugation of both received polarizations before demodulation.

Importantly, different from each of the prior art discussed above, the detection and correction of "inconsistent spectral polarity" is carried out at the transmitter. This way the invention enables practical data-aided PDM-transmission even with mutually orthogonal training sequences transmitted simultaneously on the H and V polarizations, and without having to rely on a back channel from the receiver to the transmitter.

Preferably, the first and second pilot signals are chosen such as to induce a beating component in the signal detectable by said detector that is indicative as to whether or not an inconsistent spectral polarity applies. Herein, the first and second pilot signals are preferably periodic signals, in particular sinusoidal signals.

Preferably, the frequency of the beating component is related to the frequencies of the first and second pilot signals. In particular, the frequencies of the first pilot signal and the second pilot signal are preferably at least approximately identical, and the frequency of the beating component is precisely or essentially twice the frequency of the first and second pilot signals. The beating products can be easily and reliably detected even after quadratic-law photodetection. The advantage of a beating component at a predetermined frequency is that it can be detected with high precision by searching for a corresponding frequency line in the output of the detection.

Preferably, the first and second pilot signals are orthogonal, or at least essentially orthogonal signals, in the sense that their inner product, i.e. an integral over their product, is zero.

In a preferred embodiment, the light outputted by the second DP-MZM is subjected to a polarization conversion, in particular a TE/TM polarization conversion. In a preferred embodiment, at least part of the light outputted by the first DP-MZM and at least part of the polarization converted light outputted by the second DP-MZM are combined in a combined output, in particular by means of a polarization beam splitter. This way, a polarization division multiplexed signal can be created.

However, the portions of the light outputted by the first and second DP-MZMs and received at said detector preferably have non-orthogonal polarizations. According to one embodiment, this is achieved by directing said portion of the light outputted by the second DP-MZM to the detector prior to its polarization conversion.

However, in some embodiments, the two DP-MZMs may be integrated in a single component that does not allow to tap the individual outputs of the DP-MZMs, and in particular, the output of the second DP-MZM prior to its polarization conversion. In this case, a second polarization beam splitter may be provided for splitting at least a portion of the combined output into first and second components of differing polarizations. The detector may then be arranged to detect e.g. the first of these components. Generally, the polarization of the first component will contain a linear combination of the first and second polarizations, e.g. of the H- and V-polarizations referred to above. In this case, the detector would hence still detect light comprising at least a portion of the light outputted by the first DP-MZM and a portion of the light outputted by the second DP-MZM. Further, if the pilot signals are chosen such as to induce a beating component, then this beating component would still be detectable by the detector.

Only in the pathological case that the polarizations of the first and second components should precisely coincide with the first and second polarizations, no interference and hence no beating between the two components of the first and second DP-MZMs would occur. To cope with this pathological case and to guarantee that the sensitivity of the detector does not vanish under these conditions, the aforementioned detector, or a further detector is arranged to detect a superposition of the first and second components. The detector preferably comprises a photo detector, in particular a photo diode for detecting the intensity of the received light.

The present invention further provides an optical transmitter comprising a light source, a modulator for polarization division multiplexed signals according to one of the embodiments described above and a control unit, said control unit being configured to determine, based on a signal detected by the detector of said modulator whether the slopes of the transfer functions are different for the in-phase and quadrature components of one of the first and second DP-MZMs and identical for the other of the first and second DP-MZMs, and, if this is determined to be the case, to adjust said modulator or the input to said modulator such that the sign of the slope of the transfer function of one of the in-phase or quadrature components in one of the first and second DP-MZMs is actually or virtually reversed.

Herein, the control unit is preferably adapted to actually or virtually reverse the sign of the transfer function by effecting a complex conjugation of the output signal of one of the first or second DP-MZMs in the equivalent complex baseband. This complex conjugation can be carried out purely digitally, e.g. by inverting the sign of the driving signal of a quadrature component of one of the DP-MZMs, or by swapping the in-phase and quadrature components of the driving signals for one of the polarizations. This is an example of "virtually reversing" the sign of a transfer function, because the sign of the transfer function is not actually reversed, but the effect of the modification of the driving signal on the optical signal is the same as that of a sign change of a transfer function.

The present invention further relates to a method of controlling an optical transmitter, said optical transmitter comprising a modulator for polarization-division-multiplexing (PDM) transmission comprising first and second Dual Parallel Mach-Zehnder-interferometers (DP-MZMs) associated with first and second polarizations, each DP-MZM having an input for an in-phase and a quadrature driving signal for modulating the in-phase and quadrature components of an optical signal according to a respective transfer function. The method comprising the following steps:

superimposing a first pilot signal on one of the in-phase and quadrature driving signals of the first DP-MZM and on one of the in-phase or quadrature driving signals of the second DP-MZM, superimposing a second pilot signal on the respective other of the in-phase and quadrature components of the first and second DP-MZMs, detecting light comprising at least a portion of the light outputted by the first DP-MZM and a portion outputted by the second DP-MZM, determining, from the detected light, whether the slopes of the respective transfer functions are different for the in-phase and quadrature components of one of the first and second DP-MZMs and identical for the other of the first and second DP-MZMs, and if this is determined to be the case, adjusting the modulators or the input to said modulators such that the sign of the slope of the transfer function of one of the in-phase or quadrature component in one of the first and second DP-MZMs is actually or virtually reversed.

Preferably, the first and second pilot signals are superimposed along with the bias voltage on driving signals representing data signals with training sequences, wherein the training sequences corresponding to the first DP-MZM and the training sequence corresponding to the second DP-MZM are orthogonal to each other.

DESCRIPTION OF THE PREFERRED EMBODIMENTS

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device and method and such further applications of the principles of the invention as illustrated therein being contemplated therein as would normally occur now or in the future to one skilled in the art to which the invention relates.

Figure 3:
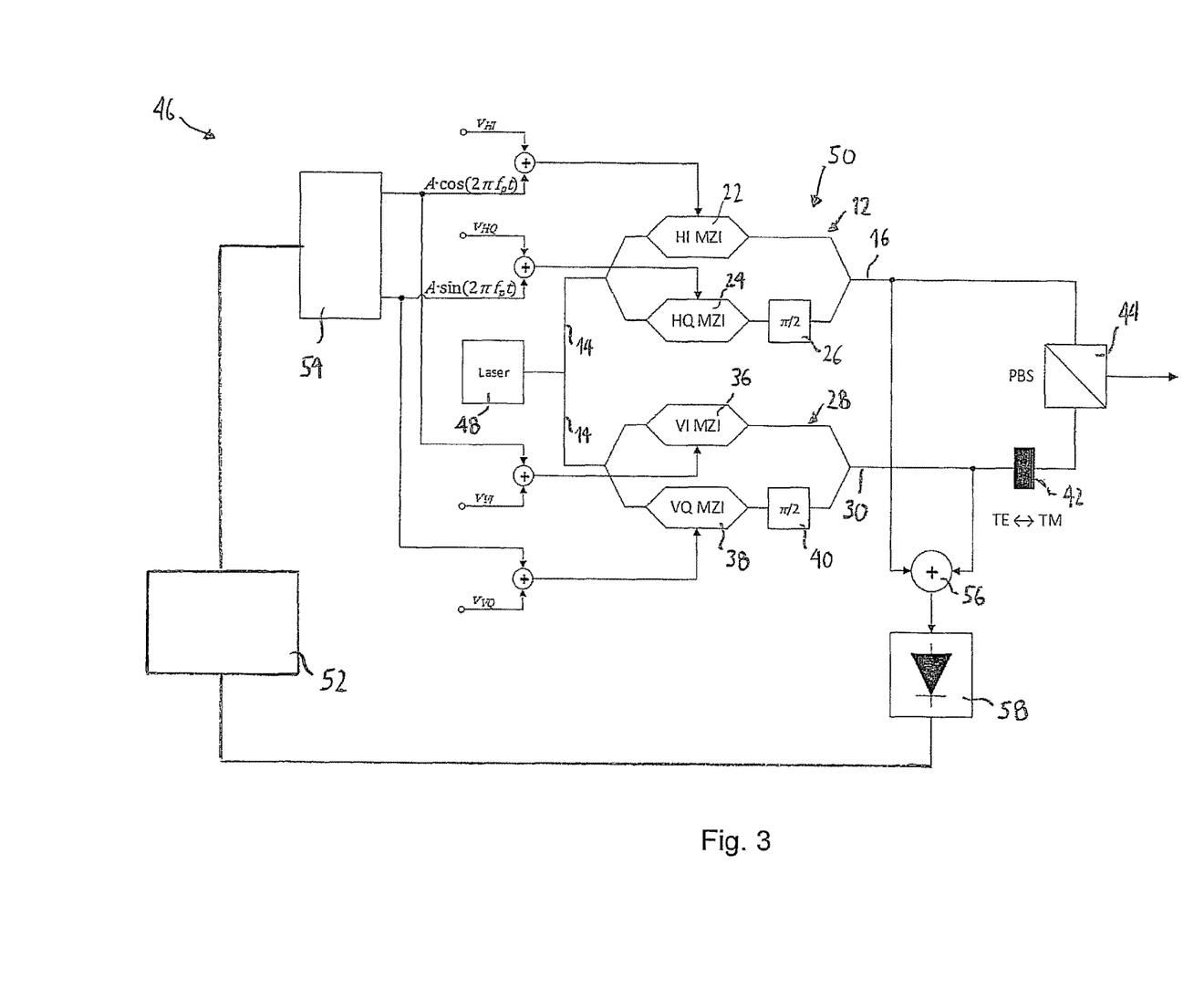
FIG. 3 shows a transmitter according to an embodiment of the present invention.

FIG. 3 shows a transmitter 46 according to an embodiment of the present invention. The transmitter comprises a laser 48, a modulator 50 and a control unit 52. The modulator 50 has generally a similar structure as the prior art modulator of FIG. 1, and likewise comprises first and second DP-MZMs 12, 28 as well as a TE/TM polarization conversion unit 42 and a polarization beam splitter 44. Like components in the modulator 50 of FIG. 3 are designated with the same reference signs as in FIG. 1, and these components are not described again.

However, in addition to the components of the modulator 10 of FIG. 1, the modulator 50 of the invention comprises a pilot tone generator 54 for generating a first pilot signal that is superimposed on the in-phase driving voltages $V_{HI}$ and $V_{VI}$ of the first and second DP-MZMs 12, 28, and a second pilot signal that is superimposed on the quadrature driving voltages $V_{HQ}$ and $V_{VQ}$ of the first and second DP-MZMs 12, 28. In the embodiment of FIG. 3, the pilot signals are superimposed on the respective driving signals using adders 56. In the embodiment shown, the first and second pilot signals are both sinusoidal and shifted with respect to each other by 90°. More particularly, the first and second pilot signals are of the form $A \cdot \cos(2\pi f_p t)$ and $A \cdot \sin(2\pi f_p t)$, respectively, where A is the signal amplitude, $f_p$ is the pilot tone frequency and t is the time. As is further shown in FIG. 3, the output 16 of the first DP-MZM 12 and the output 30 of the second DP-MZM 28 are tapped, the tapped signals are combined using a coupler 56, and the combined signal is directed to a detector 58, which in the embodiment of FIG. 3 is formed by a photodiode. Accordingly, the detector 58 is suitable and arranged for detecting light comprising a portion of the light outputted by the first DP-MZM 12 and a portion of the light outputted by the second DP-MZM 28. The output of the detector 58 is connected with a control unit 52.

As will be explained below, in case of "inconsistent spectral polarity", the output signal of the detector 58 will include a beating component at a frequency $2f_p$, i.e. at twice the frequency of the pilot signals, which can be detected by the control unit 52. Herein, as mentioned before, the "inconsistent spectral polarity" refers to a situation in which the slopes of the transfer functions are different for the in-phase and quadrature components of one of the first and second DP-MZMs 12, 28, and identical for the other of the first and second DP-MZMs 12, 28. If this is determined to be the case, the control unit 52 adjusts the modulator 50 or the input to said modulator 50 such that the sign of the slope of the transfer function of one of the in-phase or quadrature components in one of the first and second DP-MZMs 12, 28 actually or virtually is reversed. This can for example be achieved by effecting a complex conjugation of the output signal of one of the first or second DP-MZMs 12, 28, for example by reversing the sign of the control voltage $V_{HQ}$ or $V_{VQ}$. As mentioned above, this would amount to a "virtual" sign change of the corresponding transfer function. A purely digital implementation of this complex conjugation is preferred. However, other ways to adjust the modulator or the input to said modulator accordingly are likewise possible. For example, it would be possible to apply a suitable bias voltage to one of the inner MZMs 22, 24, 36, 38 or the like, in which case the sign of the slope of the transfer function could be "actually" reversed.

Next, the functioning of the transmitter 46 including the modulator 50 according to an embodiment of the invention shall be explained. In the embodiment shown in FIG. 3, it is assumed that each of the inner MZMs 22, 24, 36, 38 have the following transfer function:

$$E = Z \cdot E_{max} \cdot \sin\left(\pi \frac{V}{2V_\pi}\right), \quad (4)$$

where E is the amplitude of the electric field of the optical signal, $E_{max}$ is the maximum amplitude, $2V_\pi$ is the half-period of the transfer function and $$Z = \begin{cases} 1 & \text{if the biasing point has positive slope} \\ -1 & \text{if the biasing point has negative slope} \end{cases}. \quad (5)$$

The optical signal $s_H$ generated at the output 16 of the first DP-MM 12, in presence of the pilot signals, reads $$s_H = Z_{HI} \cdot E_{max} \cdot \sin\left(\pi \frac{V_{HI} + A \cdot \cos(2\pi f_p t)}{2V_\pi}\right) + \\ j \cdot Z_{HQ} \cdot E_{max} \cdot \sin\left(\pi \frac{V_{HQ} + A \cdot \sin(2\pi f_p t)}{2V_\pi}\right). \quad (6)$$

Herein, the frequency $f_p$ of the pilot signals is much lower than the symbol rate of the PDM QAM transmit signal, and is preferably in a range of 100 Hz to 50 kHz, more preferably in a range of 1 to 5 kHz. Further, to avoid excessive disturbance of the transmitted signal, the amplitude A of the pilot signals is chosen to be small with respect to $2V_\pi$. As a consequence, $s_H$ can be well approximated as $$s_H \cong u_H + p_H, \quad (7)$$
where $$u_H = E_{max} \cdot \left[Z_{HI} \cdot \sin\left(\pi \frac{V_{HI}}{2V_\pi}\right) + j \cdot Z_{HQ} \cdot \sin\left(\pi \frac{V_{HQ}}{2V_\pi}\right)\right]. \quad (8)$$

is the useful signal and $$p_H = \frac{\pi A}{2V_\pi} \cdot E_{max} \cdot \\ \left[Z_{HI} \cdot \cos(2\pi f_p t) \cdot \cos\left(\pi \frac{V_{HI}}{2V_\pi}\right) + j \cdot Z_{HQ} \cdot \sin(2\pi f_p t) \cdot \cos\left(\pi \frac{V_{HQ}}{2V_\pi}\right)\right] \quad (9)$$

is the contribution from the pilot tones. In the same manner, the V-polarization component $s_V$ can be expressed as:

$$s_V \cong u_V + p_V, \quad (10)$$
where $$u_V = E_{max} \cdot \left[Z_{VI} \cdot \sin\left(\pi \frac{V_{VI}}{2V_\pi}\right) + j \cdot Z_{VQ} \cdot \sin\left(\pi \frac{V_{VQ}}{2V_\pi}\right)\right] \quad (11)$$
and $$p_V = \frac{\pi A}{2V_\pi} \cdot E_{max} \cdot \\ \left[Z_{VI} \cdot \cos(2\pi f_p t) \cdot \cos\left(\pi \frac{V_{VI}}{2V_\pi}\right) + j \cdot Z_{VQ} \cdot \sin(2\pi f_p t) \cdot \cos\left(\pi \frac{V_{VQ}}{2V_\pi}\right)\right]. \quad (12)$$

As is seen from FIG. 3, a small portion of the output of the first DP-MZM 12 and a small portion of the output of the second DP-MZM 28—prior to TE/TM polarization conversion—are added in the combiner 56 and subjected to an electro-optical conversion by the detector 58, i.e. a photodiode. After low-pass filtering, the resulting electrical signal is $$y = \frac{\overline{|s_H + s_V|^2}}{\left(\frac{\pi A}{2V_\pi}\right)^2} \cong \frac{\overline{|u_H + u_V|^2}}{\left(\frac{\pi A}{2V_\pi}\right)^2} + \frac{\overline{|p_H + p_V|^2}}{\left(\frac{\pi A}{2V_\pi}\right)^2}, \quad (13)$$

where the overbar denotes a time averaging over a time scale that is long as compared to the symbol rate, but considerably shorter than the period of the pilot tone, and where an immaterial scaling factor has been applied. By substituting equations (9) and (12) into (13), the following expression for the electrical signal is obtained $$y \cong \frac{\overline{|u_H + u_V|^2}}{\left(\frac{\pi A}{2V_\pi}\right)^2} + \overline{\left[\cos^2\left(\pi \frac{V_{HI}}{2V_\pi}\right) + \cos^2\left(\pi \frac{V_{VI}}{2V_\pi}\right)\right]} \cdot \\ \cos^2(2\pi f_p t) + \overline{\left[\cos^2\left(\pi \frac{V_{HQ}}{2V_\pi}\right) + \cos^2\left(\pi \frac{V_{VQ}}{2V_\pi}\right)\right]} \cdot \sin^2(2\pi f_p t) + \\ 2 \cdot Z_{HI} \cdot Z_{VI} \overline{\cos\left(\pi \frac{V_{HI}}{2V_\pi}\right) \cdot \cos\left(\pi \frac{V_{VI}}{2V_\pi}\right)} \cdot \cos^2(2\pi f_p t) + \\ 2 \cdot Z_{HQ} \cdot Z_{VQ} \cdot \overline{\cos\left(\pi \frac{V_{HQ}}{2V_\pi}\right) \cdot \cos\left(\pi \frac{V_{VQ}}{2V_\pi}\right)} \cdot \sin^2(2\pi f_p t) \quad (14)$$

It can then be further assumed that $$\overline{\cos^2\left(\pi \frac{V_{HI}}{2V_\pi}\right)} + \overline{\cos^2\left(\pi \frac{V_{VI}}{2V_\pi}\right)} = \overline{\cos^2\left(\pi \frac{V_{HQ}}{2V_\pi}\right)} + \overline{\cos^2\left(\pi \frac{V_{VQ}}{2V_\pi}\right)} \equiv 2 \cdot C_2 \quad (15)$$
and $$\overline{\cos\left(\pi \frac{V_{HI}}{2V_\pi}\right) \cdot \cos\left(\pi \frac{V_{VI}}{2V_\pi}\right)} = \overline{\cos\left(\pi \frac{V_{HQ}}{2V_\pi}\right) \cdot \cos\left(\pi \frac{V_{VQ}}{2V_\pi}\right)} \equiv C_1^2, \quad (16)$$

such that one obtains $$y \cong \frac{\overline{|u_H + u_V|^2}}{\left(\frac{\pi A}{2V_\pi}\right)^2} + 2 \cdot C_2 + \quad (17)$$

$$2 \cdot Z_{HI} \cdot Z_{VI} \cdot C_1^2 \cdot \left[\cos^2(2\pi f_p t) + \frac{Z_{HQ}}{Z_{HI}} \cdot \frac{Z_{VQ}}{Z_{VI}} \sin^2(2\pi f_p t)\right].$$

Equation (17) shows that the electrical output signal of the photodiode 58 provides a suitable criterion to identify inconsistent spectral polarity, because it contains a spectral line of frequency $2f_p$ if and only if $$\frac{Z_{HQ}}{Z_{HI}} \neq \frac{Z_{VQ}}{Z_{VI}}. \quad (18)$$

Note that equation (18) holds exactly if the slopes of the transfer functions are different for the in-phase and quadrature components of one of the first and second DP-MZMs 12, 28 and identical for the other of the first and second DP-MZMs 12, 28. Accordingly, the control unit 52 is configured to look for the presence of a spectral line of frequency $2f_p$ to detect inconsistent spectral polarity at the transmitter 46. If such inconsistent spectral polarity is detected, the correction is implemented via a complex conjugation of exactly one transmitter polarization (either $s_H$ or $s_V$). As discussed above, the remaining ambiguity can then be detected and if necessary corrected at the receiver by conjugating both received polarizations.

Note that a similar result is achieved if equation (13) is generalized in that each of $s_H$ and $s_V$ have an arbitrary phase, i.e. if $s_H$ and $s_V$ would be multiplied with a corresponding complex number. In this general case too, the criterion (18) for the beating signal remains valid.

Figure 4:
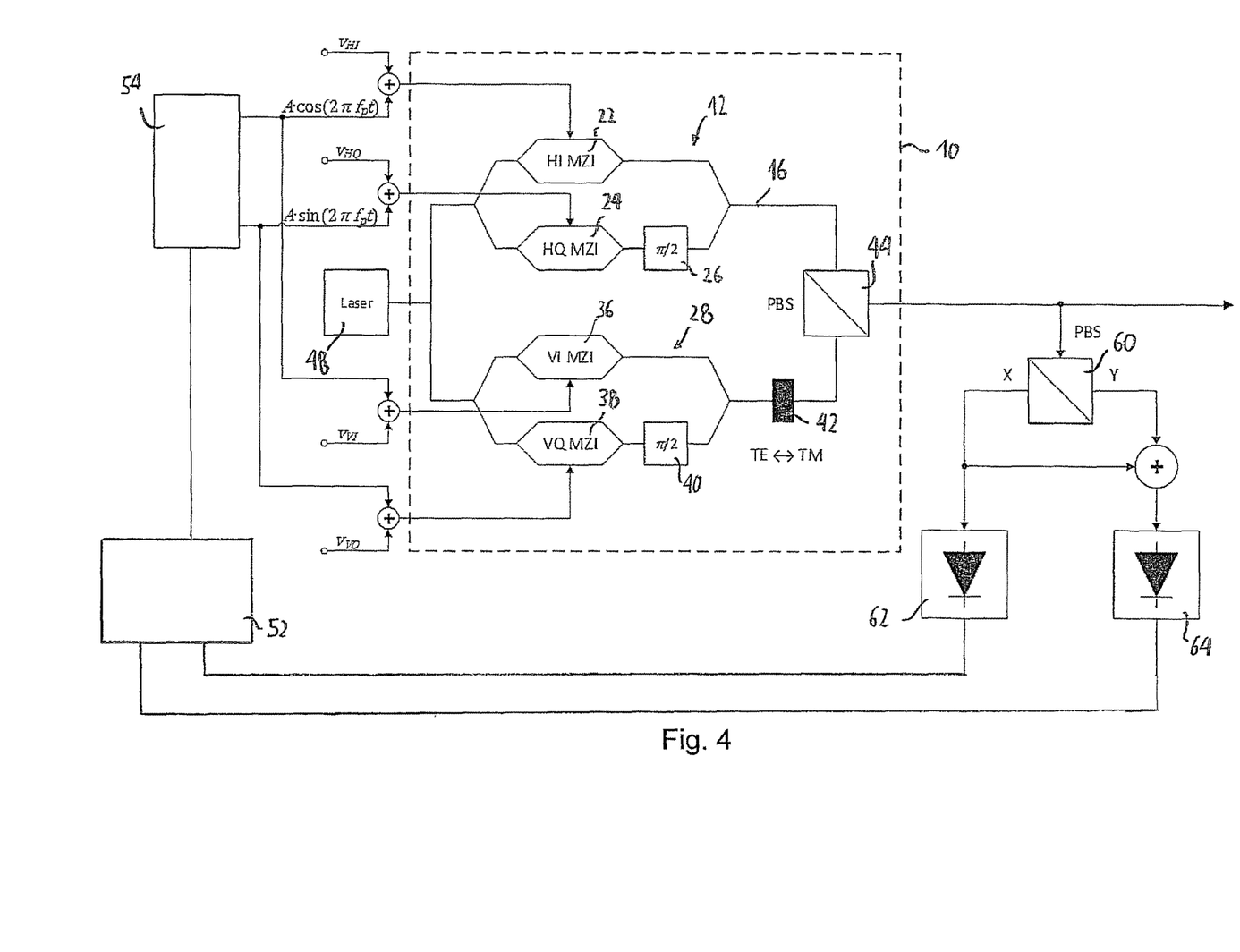
FIG. 4 shows a transmitter according to another embodiment of the present invention.

In some circumstances, the two DP-MZMs 12, 28 including the four inner MZMs 22, 24, 36, 38 may be integrated in a single component that does not allow to tap the optical tributaries as shown in FIG. 3.

FIG. 4 shows an alternative embodiment of the transmitter 46 in which essentially a prior art modulator 10 as shown in FIG. 1 is employed, which amounts to the components included in the dashed box. As is seen in FIG. 4, a small portion of the combined optical output, i.e. downstream of the polarizer PBS 44, is tapped and split through a further PBS 60 into two orthogonal polarizations X and Y. Generally, these polarization planes will each contain a linear combination of the original transmit polarizations H and V. Therefore, after photo-detection both X and Y will give rise to the beating between the pilot tones in the same way as explained above. Accordingly, using photodetector 62 shown in FIG. 4, the beating signal can be detected for example from the X-component, since this X-component comprises a portion of light outputted by the first DP-MZM 12 and a portion of light outputted by the second DP-MZM 28.

Figure 5:
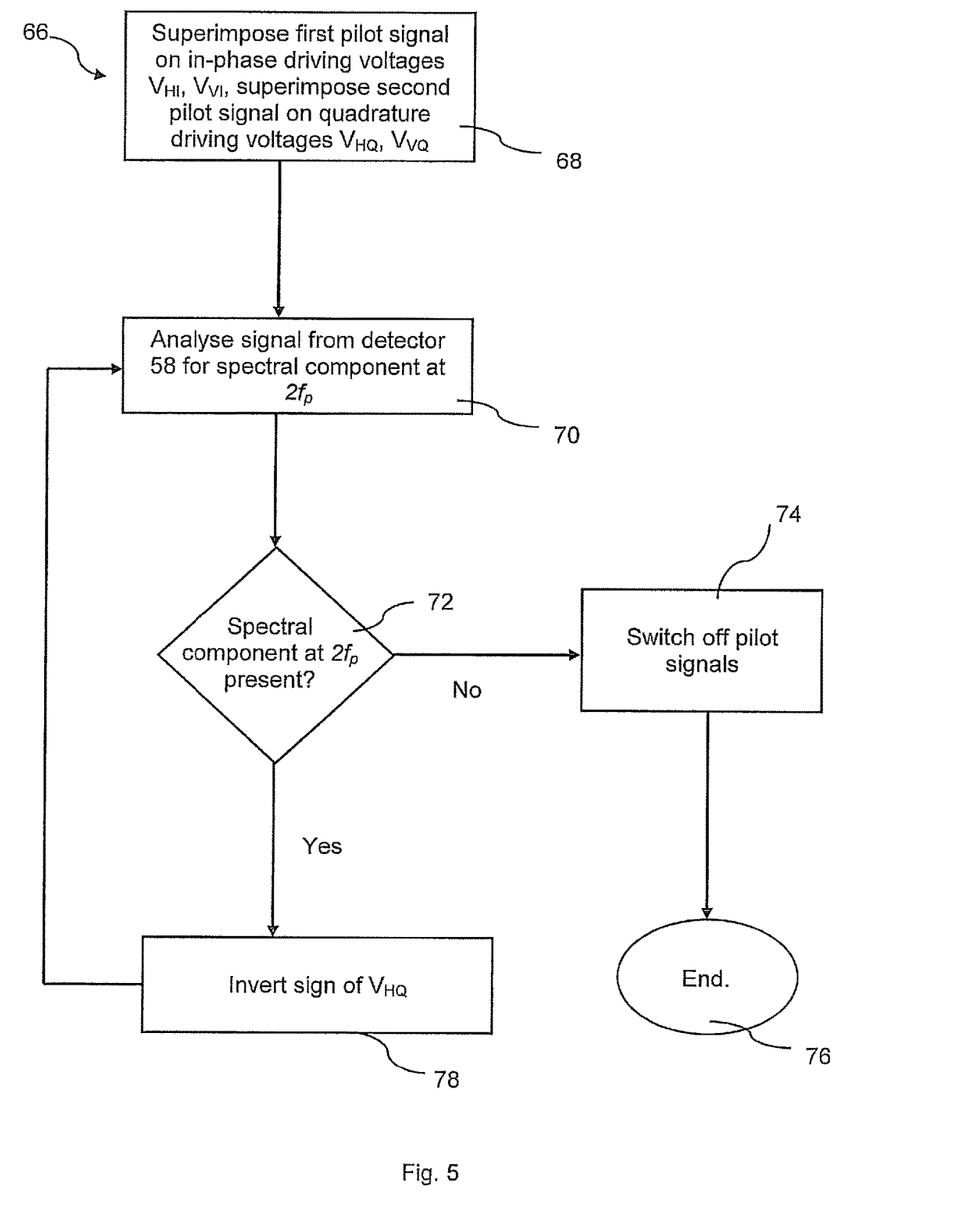
FIG. 5 shows a flow diagram illustrating a method according to an embodiment of the invention.

However, if X and Y should coincide exactly with H and V, there would be no beating between the two polarizations. To cope with this pathological case and to guarantee that the sensitivity of the detector does not vanish under any conditions, according to FIG. 4 both the signals corresponding to the polarization X and the sum of the signals corresponding to the polarizations X and Y are detected, using a further detector 64. It is seen that in case of inconsistent spectral polarity, at least one of these two signals will exhibit a line at the frequency $2f_p$ after photodetection. To avoid replicating twice the same hardware, it would also be possible to check alternatively over time the X-signal and the (X+Y)-signal, which requires a single detector and an optical or electrical switch.

In FIG. 5, a flow diagram illustrating an embodiment for controlling an optical transmitter, such as the optical transmitter 46 of FIG. 3 or 4 is shown. In step 68, a first pilot signal is superimposed along with the bias voltage on the in-phase driving voltages $V_{HI}$, $V_{VI}$, and a second pilot signal is superimposed on the quadrature driving voltages $V_{HQ}$, $V_{VQ}$. While the process 66 is not limited to this, in many important applications the first and second pilot signals can for example be superimposed on driving signals representing data signals with training sequences, wherein the training sequences corresponding to the first DPMZM 12 and the training sequence corresponding to the second DPMZM 28 are orthogonal to each other.

In step 70, the electrical output signal of the detector 58 is analyzed for a spectral component at a frequency of $2f_p$. In step 72, it is checked whether a spectral component at $2f_p$ is present. If this is not the case, then the process proceeds to step 74, in which the pilot signals are switched off, and ends at 76. In an alternative embodiment, the pilot signals do not need to be switched off. In this case it would be possible to go from step 72-No back to step 70 in an infinite loop.

However, if in step 72 a spectral component at $2f_p$ is detected in the output signal of the detector 58, this is indicative of an inconsistent spectral polarity. In order to correct for this inconsistent spectral polarity, the process proceeds to step 78, in which the sign of the control signal $V_{HQ}$ is reversed. This can be regarded as a complex conjugation of the input signal in the equivalent complex base band, and likewise leads to a complex conjugation of the optical output signal of the first DP-MZM 12 in the equivalent base band. Note that this also has the same effect as changing the sign of the transfer function of the corresponding second inner MZM 24. The process then returns to step 70, and the loop is repeated, until in step 72, the spectral component at $2f_p$ is detected. Under normal operation, after the inversion of the sign of $V_{HQ}$ in step 78, in the next round the spectral component at $2f_p$ should vanish, and the program should come to an end 76. While not shown in FIG. 6, the process may include a timeout function which stops the process and effects an error message if the end of the procedure is not reached within a given time period.

The embodiments described above and the accompanying figures merely serve to illustrate the method according to the present invention, and should not be taken to indicate any limitation of the method. The scope of the patent is solely determined by the following claims.

LIST OF REFERENCE SIGNS

10 modulator for PDM signals
12 first DP-MZM
14 input to first DP-MZM 12
16 output of first DP-MZM 12
18 first arm of first DP-MZM 12
20 second arm of first DP-MZM 12
22 first MZM
24 second MM
26 phase shifter
28 second DP-MZM
30 output of second DP-MZM 28
32 first arm of second DP-MZM 28

34 second arm of second DP-MZM 28
36 third MZM
38 fourth MZM
40 phase shifter
42 TE/TM polarization converter
44 polarization beam splitter
46 transmitter
48 laser
50 modulator for polarization-division multiplexed signals
52 control unit
54 pilot tone generator
56 adder
58 photodiode
60 polarization beam splitter
62 photodiode
64 photodiode
66 to 78 steps of flow diagram

The invention claimed is:

1. A modulator for polarization-division multiplexed (PDM) signals, comprising
   first and second Dual Parallel Mach-Zehnder-Modulators (DP-DP-MZMs) associated with first and second polarizations, each DP-MZM having an input for an in-phase and a quadrature driving signal for modulating in-phase and quadrature components of an optical signal according to respective transfer functions, and
   a detector suitable for detecting light comprising at least a portion of light outputted by the first DP-MZM and a portion of light outputted by the second DP-MZM,
   wherein said modulator is adapted to superimpose
   a first pilot signal on one of the in-phase and quadrature driving signals of the first DP-MZM and on one of the in-phase and quadrature driving signals of the second -DP-MZM, and
   a second pilot signal on the respective other of the in-phase and quadrature driving signals of the first and second DP-MZMs, and
   wherein the first and second pilot signals are chosen such that the signal detectable by said detector is indicative as to whether the slopes of the transfer functions are different for the in-phase and quadrature components of one of the first and second DP-MZMs and identical for another of the first and second DP-MZMs.

2. The modulator of claim 1, wherein said first and second pilot signals are chosen such as to induce a beating component in said signal detectable by said detector.

3. The modulator of claim 1, wherein the first and second pilot signals are periodic signals.

4. The modulator of claim 2, wherein a frequency of the beating component is related to frequencies of said first and second pilot signals.

5. The modulator of claim 4, wherein the frequencies of the first pilot signal and the second pilot signal are at least approximately identical, and wherein a frequency of the beating component is essentially twice the frequency of the first and second pilot signals.

6. The modulator of claim 1, wherein the first and second pilot signals are essentially orthogonal signals.

7. The modulator of claim 1, wherein the light outputted by the second DP-MZM is subjected to a polarization conversion.

8. The modulator of claim 7, wherein at least part of the light outputted by the first DP-MZM and at least part of the polarization converted light outputted by the second DP-MZM are combined in a combined output.

9. The modulator of claim 8, wherein said at least part of the light outputted by the first and second DP-MZMs and received at said detector have non-orthogonal polarizations.

10. The modulator of claim 7, wherein said at least part of the light outputted by the second DP-MZM is directed to said detector prior to its polarization conversion.

11. The modulator of claim 7, wherein a polarization beam splitter is provided for splitting at least a portion of said combined output into first and second components of differing polarizations.

12. The modulator of claim 11, wherein the detector is arranged to detect said first component.

13. The modulator of claim 10, wherein the detector or a further detector is arranged to detect superposition of said first component and second components.

14. The modulator of claim 1, wherein the detector comprises a photodetector for detecting the intensity of the received light.

15. An optical transmitter comprising
    a light source,
    a modulator for polarization-division-multiplexed (PDM) signals as recited in claim 1 for modulating light outputted by said light source, and
    a control unit, said control unit being configured to determine, based on a signal detected by the detector of said modulator, whether slopes of transfer functions are different for the in-phase and quadrature components of one of the first and second DP-MZMs and identical for the other of the first and second DP-MZMs, and, if this is determined to be the case, to adjust said modulator or the input to said modulator such that a sign of the slope of the transfer function of one of the in-phase or quadrature components in one of the first and second DP-MZMs is effectively reversed.

16. The optical transmitter of claim 15, wherein the control unit is adapted to effectively reverse a sign of said transfer function by effecting a complex conjugation of the output signal of one of the first or second DP-MZM.

17. A method of controlling an optical transmitter, said optical transmitter comprising a modulator for polarization-division-multiplexing (PDM) signals comprising first and second Dual Parallel Mach-Zehnder-interferometers (DP-MZMs) associated with first and second polarizations, each DP-MZM having an input for an in-phase and a quadrature driving signal for modulating in-phase and quadrature components of an optical signal according to a respective transfer function,
    said method comprising the following steps:
    superimposing a first pilot signal on one of the in-phase and quadrature driving signals of the first DP-MZM and on one of the in-phase or quadrature driving signals of the second DP-MZM,
    superimposing a second pilot signal on the respective other of the in-phase and quadrature components of the first and second DP-MZMs,
    detecting light comprising at least a portion of the light outputted by the first DP-MZM and a portion outputted by the second DP-MZM,
    determining, from the detected light, whether the slopes of the respective transfer functions are different for the in-phase and quadrature components of one of the first and second DP-MZMs and identical for the other of the first and second DP-MZMs, and
    if this is determined to be the case, adjusting the modulators or the input to said modulators such that the sign of the slope of the transfer function of one of the in-phase or quadrature component in one of the first and second DP-MZMs is effectively reversed.

18. The method of claim 17, wherein the first pilot signal is superimposed on the respective in-phase driving signals of the first and of the second DP-MZM and the second pilot signal is superimposed on the respective quadrature driving signals of the first and of the second DP-MZM.

19. The method of claim 17, wherein the first and second pilot signals are superimposed on driving signals representing training sequences, wherein the training sequences corresponding to the first DP-MZM and the training sequence corresponding to the second DP-MZM are orthogonal to each other.

20. The method of claim 17, wherein said step of determining is based on a detection of a beating component in said detected light.

21. The method of one of claim 17, wherein the first and second pilot signals are periodic signals.

22. The method of claim 20, wherein a frequency of the beating component is related to the frequencies of said first and second pilot signals.

23. The method of claim 22, wherein the frequencies of the first pilot signal and the second pilot signal are at least approximately identical, and wherein the frequency of the beating component is essentially twice the frequency of the first and second pilot signals.

24. The method of claim 17, wherein the first and second pilot signals are orthogonal signals.

25. The method of one of claim 17, wherein the step of adjusting the modulators or the input to said modulators such as to effectively reverse the sign of said transfer function comprises effecting a complex conjugation of the output signal of one of the first or second DP-MZMs.

26. The method of one of claim 17, wherein the optical transmitter is a transmitter according to claim 15.

* * * * *